United States Patent [19]
Kamin

[11] 3,790,705
[45] Feb. 5, 1974

[54] INTERFERENCE SIGNAL COMPENSATING

[75] Inventor: Gerhard Robert Kamin, Traisa/Darmstadt, Germany

[73] Assignee: Fernseh GmbH, Darmstadt, Germany

[22] Filed: Oct. 28, 1971

[21] Appl. No.: 193,452

[30] Foreign Application Priority Data
Oct. 29, 1970 Germany .................. P 20 53 116.2

[52] U.S. Cl. .......................... 178/7.1, 178/DIG. 39
[51] Int. Cl. .......................................... H04n 5/21
[58] Field of Search ............... 178/7.1, 7.2, DIG. 39

[56] References Cited
UNITED STATES PATENTS
2,965,711 12/1960 James et al. ........................ 178/7.2
3,019,290 1/1962 Perkins ............................... 178/7.2

*Primary Examiner*—Robert L. Griffin
*Assistant Examiner*—Joseph A. Orsino, Jr.
*Attorney, Agent, or Firm*—Littlepage, Quaintance, Murphy & Dobyns

[57] ABSTRACT

Interference in television scanning signals is compensated for by integrating signals from picture areas, converting the integrated signals to digital pulses, storing maximum pulses, comparing incoming pulse values with maximums, changing maximums if necessary, and storing difference values in circulating storages, and using the difference values to control a compensating amplifier in a picture signal circuit.

6 Claims, 4 Drawing Figures

INTERFERENCE SIGNAL COMPENSATING

BACKGROUND OF THE INVENTION

The invention relates to a method of compensating for interference signals which occur in the scanning of originals.

It is necessary, particularly in the quantitative evaluation of picture signals occurring in the scanning of originals, that the picture signals correspond as precisely as possible to the luminance factor of the individual points on the original. However, interference signals, as they are called, which are superposed upon the actual picture signals, occur as a result of defective lighting and of defects in the electronic scanning system.

Although it is known in the case of television cameras to superimpose upon the picture signals compensating signals which are produced in generating means specially provided for the purpose and which may be of saw-tooth as well as parabolic form and can be adjusted as regards their amplitude, and although that method has proved reliable in television broadcasting and in industrial television, that method is not however sufficiently precise for the quantitative evaluation of picture signals obtained by scanning.

SUMMARY OF THE INVENTION

According to the invention, first a standard original, which is as near the ideal as possible is scanned. The picture signals obtained by scanning the standard original are stored as compensating signals, and then the stored compensating signals are used for influencing the picture signals obtained in scanning the original.

The method of the invention has the advantage that interference signals of any form can be compensated with great precision by means of a standardizing operation carried out prior to the actual measurement.

Since for reasons of economy it is not possible to store an indefinitely large number of compensating signals, further aspects of the invention are concerned with achieving the stated object by using the smallest possible number of storage elements.

A further feature of the invention consists in dividing the lines scanned during the standardizing operation into individual sections and integrating the signals associated with each section in an analog storage unit over a plurality of lines.

A further feature of the invention provides for the values obtained by integration to be converted into digital compensating signals.

The compensating signals are on the one hand stored over a fairly long period, for example several hours. On the other hand, digital storage units in integrated circuits, which are preferably used for reducing the invention to practice, have only a limited storage time. A further feature of the invention provides that a circulating memory, which is stepped forward in synchronism with the scanning of the line sections, is used for storing the digital compensating signals. At the end of each picture section, the compensating signals relating to that picture section are recorded during one line. The number of lines belonging to a picture section is matched to the number of line sections belonging to a line and to the number of storage locations in the circulating memory in such manner that the digital compensating signals are recorded in vacant storage locations without interruption of the circulating rhythm.

According to a further feature of the invention and for the purpose of limiting as far as possible the number of binary positions required for the compensating signals, an extreme value for the picture signals is communicated and stored during a first scanning of the standard original. The difference between each of the picture signals that occur and the extreme value is formed during a second scanning of the standard original and is stored as a compensating signal.

During the standardizing operation, compensating signals are stored only after the picture section concerned has been scanned. Those signals are required at the commencement of each picture section during the scanning of an original. Therefore, the circulating memory is provided with different tap-off points.

Furthermore, it is necessary for the compensation signals stored for each picture section to be available during each line of this picture section. A further storage unit is provided for this purpose.

BRIEF DESCRIPTION OF THE DRAWING

The invention will now be described in more detail by reference to the drawings, in which.

DETAILED DESCRIPTION OF THE DRAWING

Figure 1:
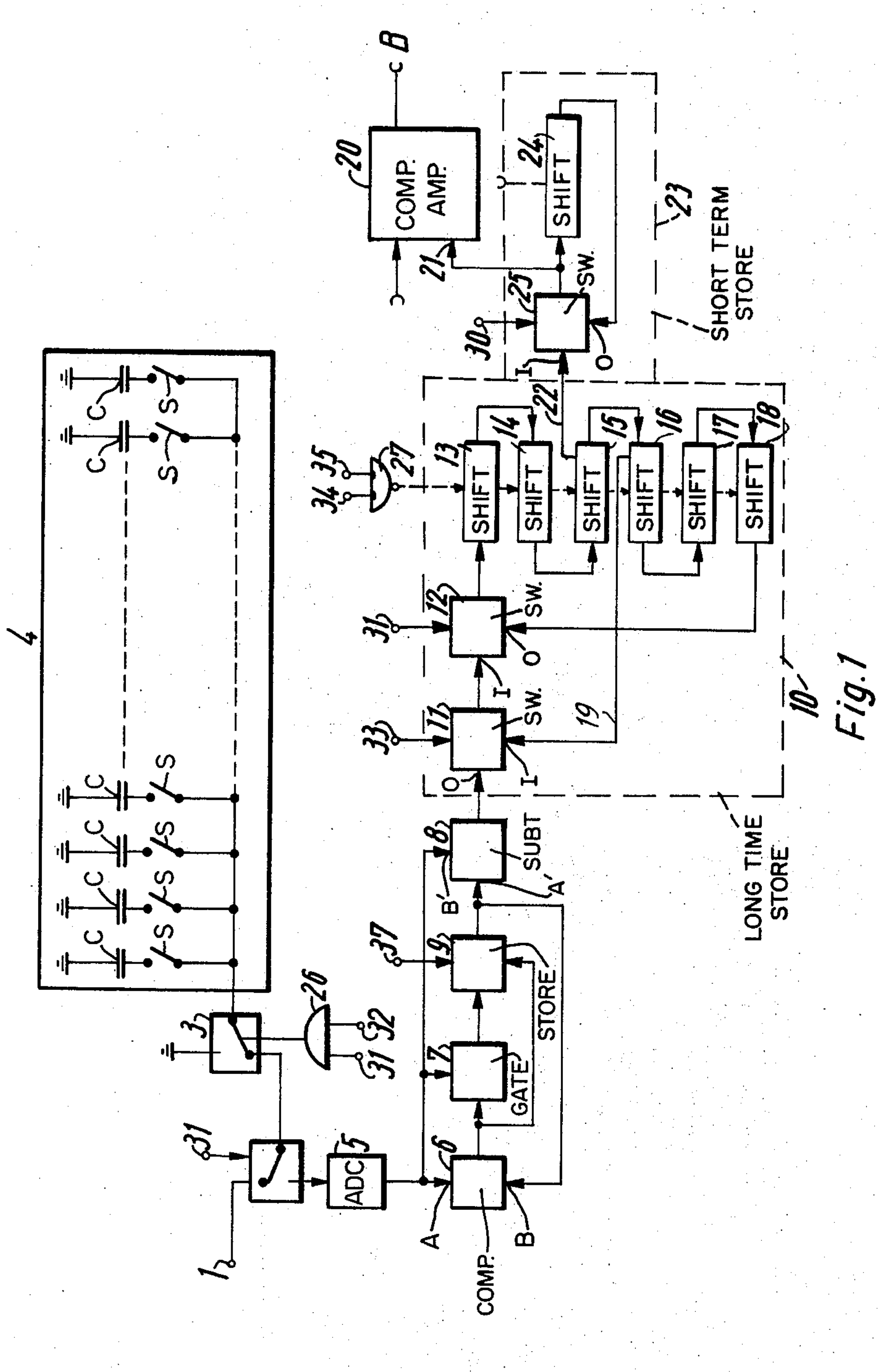
FIG. 1 shows an example of a circuit for performing the method of the invention, and FIG. 2 comprised of FIGS. 2*a* - 2*c*, shows voltage-time curves relating to signals occurring at different points in FIG. 1.

Picture signals produced by a scanning device, not illustrated, for example a television camera are passed at terminal 1 to the circuit seen in FIG. 1. The signals pass through the electronic reversing switches 2 and 3 to the integrating circuit 4. The integrating circuit 4 consists of a series of capacitors C which are connected each in its turn, to the reversing switch 3 through one of the switches S. Each of the switches S is closed during the period covered by a line section. In the present example, the scanned lines are divided into 32 sections so that 32 capacitors C and 32 switches S are provided.

A threshold circuit, not illustrated, is provided upstream of the input point 1 of the arrangement of the invention shown in FIG. 1. That circuit is adjusted in such a manner that the threshold value is exceeded by just a small residue of the smallest amplitude occurring in excess of the uncompensated video signal which corresponds to the original standard. For a given "word-length" this step permits optimum differentiation of the amplitude deviation from the reference value (maximum value).

After a line has been scanned, the capacitors are each charged to the mean value of the signal associated with the corresponding line section. The integrating process is continued over a plurality of lines, 12 in the example illustrated, so that each of the capacitors C is charged to a level which corresponds to the mean brilliance of a rectangular portion.

In the subsequent line, in the example the 13th line, the electronic reversing switch 2 is brought into the lower position, and, at the same time, the reversing switch 3 is actuated in such manner that it occupies the lower position during one half of each line section and the upper position during the other half. In this way, the values stored in the capacitors C are alternately passed to the analog-to-digital converter 5, and the capacitors then discharge.

In the present example, a four-place binary number corresponding to the input value of the analog-to-digital converter is present at the output point of converter 5. The part of FIG. 1 described below is a control circuit diagram, in which only the path along which the information travels is illustrated. Consequently, a connection represents a plurality of parallel channels, four in the present case.

The output voltage from the analog-to-digital converter 5 is supplied to one of the input points A of a comparator 6, to the input point of a gate circuit 7 and to one of the input points B' of a subtraction circuit 8. In the comparator 6, the 4-bit word present at the input point A is compared with a 4-bit word occurring at the output point of a storage unit 9 which latter 4-bit word is passed to the input point B of the comparator 6. If the value at the input point A is greater than that at B, the comparator 6 sends from its output point a pulse which on the one hand opens the gate 7 and on the other causes the storage unit 9 to store the output signal from the analog-to-digital converter 5 now present at its input point, and at the same time allows this signal to appear at its output point. In this way, the word passed to the input point B of the comparator 6 becomes identical to that passed to the input point A, and the signal at the output point of the comparator 6 acquires the value 0. The difference between the values occurring at the input points A' and B' of the subtraction circuit 8 is passed on to a so-called long-term storage unit 10, the function of which will be described in more detail hereinafter.

If the output value from the analog digital converter 5 that relates to the next line section is for example smaller than the preceding one, the comparator 6 does not supply an output voltage that opens the gate circuit, so that the preceding value is retained in the storage unit 9. If, however, the value for the following line section is greater, this is put into the storage unit 9 in the abovedescribed manner. Consequently, after a scanning area has been completed, the maximum word occurring within a scanning area is stored in the storage unit 9. This remains unchanged during the measuring of the second scanning area so that with the aid of the subtraction circuit 8 the difference from the maximum value can be determined for each picture portion, and this difference can be stored in the long-term storage unit 10. There, they replace the unusable values stored during the first area scanning. At the commencement of each standardizing operation, the contents of the storage unit 9 are cleared by means of a clearing pulse at terminal 37.

The long-term storage unit 10 consists of the two electronic reversing switches 11 and 12 and of six shift-register pulse-storing units 13 to 18, each having 128 storage locations. As mentioned above, this arrangement is repeated in parallel, but this is not illustrated.

The items of information contained in the shift-register pulse-storage elements 13 to 18 are each switched forward one place after completion of a line section. To enable circulation to take place, there is provided a reversing switch 12 which is held in the position designated by the letter O during 12 consecutive lines and assumes the position I during each 13th line, so that in each thirteenth line the values for the preceding 12 lines, determined with the aid of the integrating circuit 4, of the analog-to-digital converter 5 and of the following circuits 6 to 8, can be stored in the shift-register elements 13–18. Since the shift-register pulse-storage elements employed cannot statically store the information for an indefinitely long period (the lower limiting frequency is approximately 10 kc), the shift-register pulse-storing element is clocked at relatively high frequency. As previously mentioned, the shift-register pulse-storage element is switched forward one step after the scanning of each line section.

Since the compensating signals are delivered by the subtraction stage 8 in the same rhythm as the onward switching of the shift-register pulse-storage elements 13 to 18, the compensating signals are stored in 32 consecutive storage locations in the circulating memory during each thirteenth line.

During the subsequent 12 lines, the circulating memory is constantly switched forward. As a result of the choice of the number of line sections as well as of the number of picture sections and of the number of storage locations in the circulating memory, the compensating signals which are to be released from storage during each thirteenth line prior to covering a scanning area fill up the circulating memory consisting of the shift register pulse storage units 13 to 18.

For this reason, the division of a scanning area into 24 picture sections has proved successful. Since, however, the vertical frequency blanking occupies approximately 7 percent of the entire scanning period, the last picture section does not comprise any lines containing picture-information at all, and the penultimate picture section comprises only a part of such a line, so that the integration of these picture sections through the integrating circuit 4 supplies incorrect values. The compensating signals of the picture section prior to the penultimate one are, therefore, used as the compensating signals for these two latter picture sections. This is achieved by picking up the compensating signals from a take-off point 19 of the circulating memory through the electronic switch 11 which is switched to the I position each time at the end of the two last picture sections, and by passing the compensation signals obtained during the picture section prior to the penultimate one into the storage locations in the circulating memory that are provided for the compensating signals of the two last picture sections.

During the scanning of the original, a compensating amplifier 20 is switched into the path along which pass the picture signals produced by the scanning device. The amplification of the compensating amplifier can be controlled with the aid of binary signals supplied at amplifier input 21. When scanning the original, the circulating memory consisting of the shift-register pulse storage elements 13 to 18 is operated in the same way as in the standardizing operation. The reversing switch 12, however, is always in the 0 position. Since during the scanning of the original, the compensating signal for a particular picture section should be available at the beginning of this picture section, a further tap-off point 22 is provided for picking up the compensating signals from the circulating memory, at which tap-off point the compensating signals occur in advance of the point of input into the circulating memory.

Since, on the one hand, the circulating memory has to be continuously switched forward for the abovementioned reasons, and on the other hand the compensating signals relating to a picture section must be available during the entire picture section, there is provided a further storage unit, i.e., a short-term storage unit 23 as it is called. This consists of a 32-place shift register pulse-storage unit 24 and an electronic reversing switch 25. At the beginning of each picture section, the electronic reversing switch 25 is brought into the 1 position, so that the compensating signals are passed to the compensating amplifier 20 and to the shift-register pulse-storage unit 24. At the end of this line the compensating signals associated with the picture section that is commencing are stored in the shift-register pulse-storage unit. During the following twelve lines, the switch 25 occupies the 0 position, so that on the one hand compensating signals are continuously supplied to the compensating amplifier and on the other the information is held in the short-term storage unit 23.

When using a scanning area in accordance with the European standard, which consists of 625 lines in accordance with the interfaced scanning method, it has been found particularly advantageous to divide a line into 32 sections and a scanning area into 24 picture sections. With that arrangement, 13 lines are in each case associated with one picture section. The storage of compensating signals associated with 24 picture sections is however completed after $13 \times 24 = 312$ lines. The memory circulates a second time during the second half of the picture and circulation is completed with the 624th line. In order now to ensure correlation of the compensating signals during the following scanning, circulation of the signals through the shift-register impulse-storage units 13 to 18 is interrrupted for a period corresponding to a line after completion of each full picture. Since in accordance with the standard used, the time during which the line exists is 64 microseconds, this stoppage is possible in view of the longest (static) storage time, about 100 $\mu$ sec., of the storage unit employed.

Figures 2, 2A, 2B, 2C:
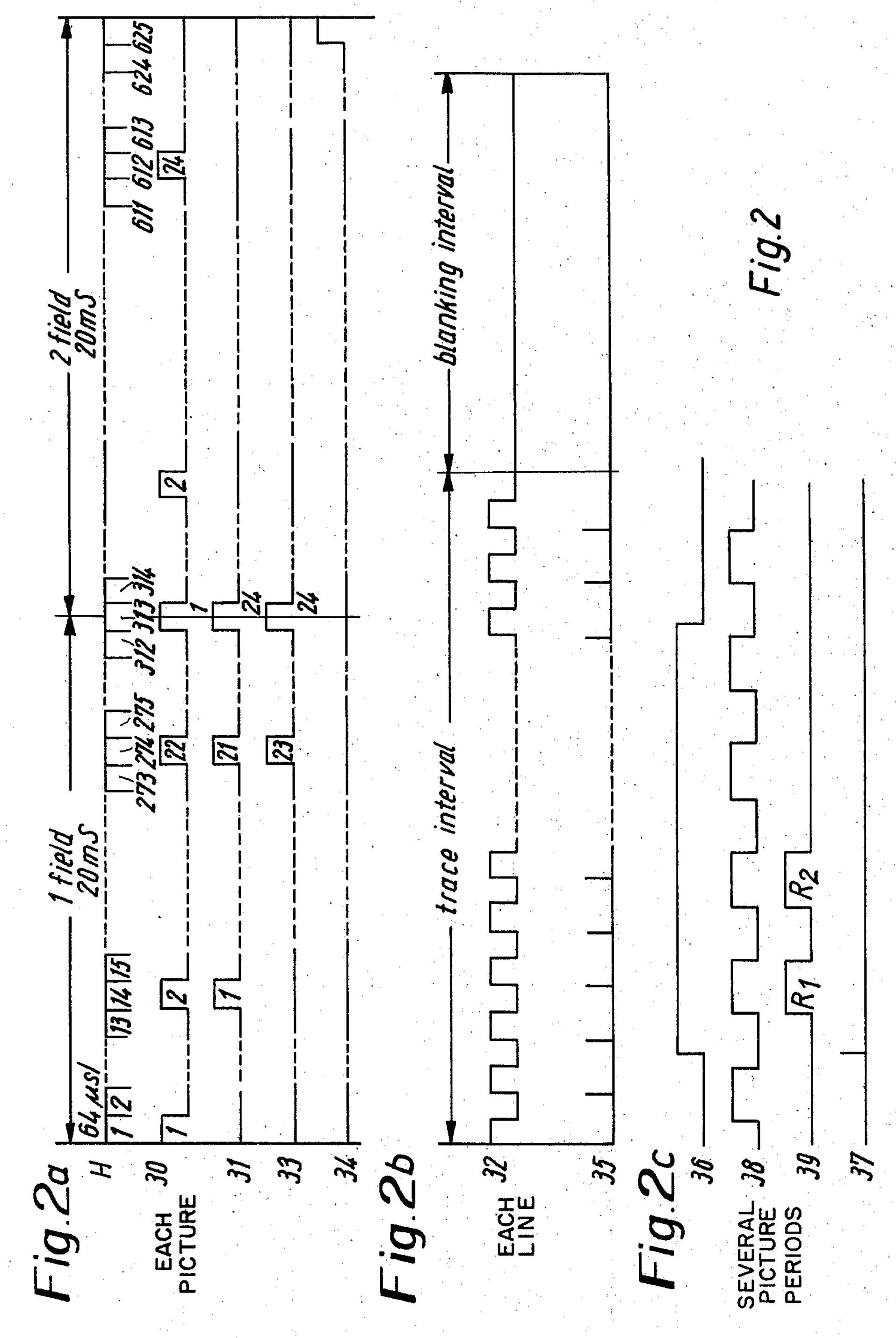

FIG. 2 shows voltage-time curves for various pulses which occur in the circuit arrangement shown in FIG. 1. The time scale of the voltage-time curves is so selected that an entire full picture with interruptions is represented in FIG. 2*a*, whereas FIG. 2*b* relates to what happens in units of time during one line. FIG. 2*c* shows signals during several picture periods for the purpose of illustrating in a rough manner how standardization proceeds with time.

In the line marked H in FIG. 2*a*, line-frequency pulses are illustrated. The scanned lines occurring between these pulses are numbered 1 – 625. The pulses designated by the numeral 30 start from the line 1 in each thirteenth line and are used to bring the electronic reversing switch 25 into the I position for accepting compensating signals for each commencing picture section from the long-term storage unit 10. The pulses shown in line 31 below also occur during each thirteenth line, but only begin with the fourteenth line of each full picture. These pulses are passed to the reversing switch 2 and cause the integrating circuit 4 to be connected to the analog-to-digital converter 5 at the end of each picture section. This connection does not however take place during the entire duration of the line but is interrupted each time for approximately the second half of each line section for the purpose of discharging the related capacitor C, with the aid of the electronic reversing switch 3. For this purpose, the pulses in line 30 in FIG. 2*a* and the negative of the pulses shown in line 32 of FIG. 2*b* are passed to a control input point of the electronic reversing switch 3 by way of an AND circuit 26.

The switches S1 - S32 are in turn actuated by correspondingly designated pulses which are illustrated in FIG. 2*b*.

In order to enable the compensating signals for the 23rd and also for the 24th picture section to be replaced by the compensating signals of the 22nd picture section, the pulses shown in line 33 in FIG. 2*a* are passed to the electronic reversing switch 11 during the 1st and 3rd scanning of the standardizing operation. At the same time, (1st and 3rd scanning of the standardizing operation) the pulses shown in the line 31 of FIG. 2*a* are passed to the electronic reversing switch 12.

To ensure synchronous further switching of the circulating memory consisting of the shift-register pulse-storage units 13 to 18 and to provide the interruption of rhythm during each 625th line that is necessary for avoiding phase-displacement which would increase with the number of picture scanning areas, signals are passed to the timing input points of the shift-register pulse-storage units by way of an AND circuit 27, which signals consist of the combination of the negated pulses 34 and pulses shown in line 35. The pulses 35 in each case indicate the commencement of a line section.

For the purpose of standardization, i.e. of storing the compensating signals, a key, not illustrated, is pressed after each standard original has been brought in. This key releases a pulse shown in line 36 in FIG. 2*c*. A short pulse shown in line 37 is derived from the front flank of said pulse 36, the short pulse being passed to the storage unit 9 for clearing purposes. Two pulses 39 are formed from the pulse 36 provided by operating the key and from a square-wave voltage of half vertical frequency (line 38). The pulses 31 and 33 occur only during this pulse 39. The actual standardizing operation takes place during these pulses. As described above, the extreme value is determined during the first pulse, and during the second pulse the compensating signals are passed into the long-term storage unit 10.

While the invention has been particularly shown and described with reference to a preferred embodiment thereof, it will be understood by those skilled in the art that various changes in form and details may be made therein without departing from the spirit and scope of the invention.

What is claimed is:

1. The method of compensating interference signals which occur in the scanning of non-standard original scenes, comprising the steps of:

first scanning a standard original scene which is as near the ideal as possible to obtain picture signals, storing the picture signals thus obtained as stored compensating signals, scanning a non-standard original scene and to thereby create picture signals, and applying the stored compensating signals to a compensation means for correcting the picture signals created during the scanning of the non-standard original scene, wherein the first scanning step during a standardizing operation further comprises the step of dividing lines into individual sections and wherein the storing step further comprises the step of integrating signals associated with each corresponding section of a plurality of lines in an analog storage unit and further comprising the steps of determining and storing an extreme value of the picture signals, during a first scanning of the standard original scene and forming and storing as compensating signals the differences between the particular picture signals that occur during a second scanning of the standard original scene on a different area of scan and the extreme value.

2. The method according to claim 1, further comprising the steps of passing the picture signals in digital form occurring during the first scanning of the standard original scene to a first input point of a comparator, then through a gate circuit to a storage unit and then to one input point of a subtraction switch, passing a value from the storage unit to another input point of the subtraction circuit and to a second input point of the comparator, passing a signal from the comparator to a control input point of the gate circuit, and thereby recording a signal occurring at the first input point of the comparator in the storage unit by way of the gate circuit when that signal is greater than a signal occurring at the second input point.

3. Field scanning interference signal compensating apparatus comprising:

input means for receiving picture signals derived by scanning a standard original scene, integrating means connected to the input means for integrating signals from scanned areas, storing means connected to the input means for storing the integrated picture signals, adjusting means responsive to the stored picture signals for compensating corresponding picture signals derived by scanning a non-standard original scene, analog-to-digital converter means connected to the integrating means for converting the integrated signals to digital pulses and wherein the storage means is a digital storage means for storing the digital integrated signals, maximum value storage means connected to the converter means for storing a maximum digital value for each picture area and comparing means connected to the maximum value storage means for comparing newly obtained values with previously stored maximums and for thereby adjusting the maximum values to include applicable newly obtained values and determining the resulting differences.

4. Field scanning interference signal compensating apparatus comprising input means for receiving picture signals derived by scanning a standard original scene, storing means connected to the input means for storing the received picture signals, and adjusting means responsive to the stored picture signals for compensating corresponding picture signals derived by scanning a non-standard original scene, and further comprising a plurality of successive switch-controlled capacitors, a first switch connected to the input for selectively charging and reading the capacitors, a converter connected to the first switch for converting currents from the capacitors to digital values, a maximum value storage connected to the converter for storing maximum digital values from the converter, a comparator connected to the converter and to the maximum storage for comparing a new value with the stored maximum, a gate connected to the comparator, converter and the maximum storage for inserting new maximums in the storage from the comparator, a subtraction unit connected to the maximum storage and to the converter, wherein the storing means comprises a circulating storage and further comprising a storage switch connected between the circulating storage and the subtraction unit for selectively inserting difference values from the unit to the circulating storage.

5. The apparatus of claim 4 further comprising a grounding switch connected between the first switch and the capacitors for grounding the capacitors following connection to the converter.

6. The apparatus of claim 4 further comprising a second storage switch connected to the first storage switch and to first and intermediate positions of the circulating storage.

* * * * *